United States Patent
Ayadurai et al.

(10) Patent No.: US 9,894,697 B2
(45) Date of Patent: Feb. 13, 2018

(54) METHOD FOR ESTIMATING COMMUNICATION IN A DIRECT LINK

(71) Applicant: Telefonaktiebolaget L M Ericsson (publ), Stockholm (SE)

(72) Inventors: Vicknesan Ayadurai, Sollentuna (SE); Mikael Prytz, Ronninge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 172 days.

(21) Appl. No.: 14/651,291

(22) PCT Filed: Dec. 14, 2012

(86) PCT No.: PCT/EP2012/075476
§ 371 (c)(1),
(2) Date: Jun. 11, 2015

(87) PCT Pub. No.: WO2014/090320
PCT Pub. Date: Jun. 19, 2014

(65) Prior Publication Data
US 2015/0334755 A1    Nov. 19, 2015

(51) Int. Cl.
*H04W 76/02* (2009.01)
*H04W 24/08* (2009.01)
(Continued)

(52) U.S. Cl.
CPC ......... *H04W 76/023* (2013.01); *H04W 24/08* (2013.01); *H04W 72/085* (2013.01); *H04W 76/043* (2013.01)

(58) Field of Classification Search
CPC . H04W 76/023; H04W 24/08; H04W 72/085; H04W 76/043
See application file for complete search history.

(56) References Cited

U.S. PATENT DOCUMENTS

2004/0121766 A1* 6/2004 Benson ............... H04W 76/023
                                                    455/425
2006/0229092 A1* 10/2006 Jia ....................... H04W 76/023
                                                    455/517
(Continued)

FOREIGN PATENT DOCUMENTS

| CN | 102497252 A | 6/2012 |
|----|-------------|--------|
| WO | 2004077917 A2 | 9/2004 |
| WO | 2004103008 A1 | 11/2004 |

OTHER PUBLICATIONS

European Office Action issued in Application No. 12 816 038.9 dated Dec. 1, 2017, 9 pages.

*Primary Examiner* — Peter Chau
(74) *Attorney, Agent, or Firm* — Rothwell, Figg, Ernst & Manbeck, P.C.

(57) ABSTRACT

The present disclosure relates a method, performed by a communication node of a cellular radio access network, for estimating a radio link quality of a direct link between a first user equipment and a second user equipment. The invention also provides a method performed in a user equipment, which method is used to monitor communication for the purpose of estimating communication in a possible direct link between a first user equipment and a second user equipment. The communication node instructs a user equipment to eavesdrop an uplink of an other user equipment UL1. The communication node obtaining data directly from the uplink UL1 and receives eavesdropped data from the user equipment. The communication node evaluates the radio link based on the data obtained from the uplink and the data eavesdropped from the uplink. The user equipment receives an instruction to eavesdrop the uplink UL1. The user equipment receives and obtains digital data from the uplink UL1, and reports to the network.

9 Claims, 6 Drawing Sheets

(51) Int. Cl.
*H04W 72/08* (2009.01)
*H04W 76/04* (2009.01)

(56) References Cited

U.S. PATENT DOCUMENTS

| | | | |
|---|---|---|---|
| 2007/0153747 A1* | 7/2007 | Pan | H04W 36/14 370/338 |
| 2010/0142416 A1* | 6/2010 | Kim | H04B 7/15557 370/281 |
| 2010/0279672 A1 | 11/2010 | Koskela et al. | |
| 2011/0176408 A1* | 7/2011 | Sun | H04B 7/15521 370/216 |
| 2012/0182878 A1* | 7/2012 | Qian | H04B 7/155 370/242 |
| 2013/0235754 A1* | 9/2013 | Lim | H04W 72/042 370/252 |
| 2014/0057637 A1* | 2/2014 | Hoang | H04W 56/0045 455/445 |

* cited by examiner

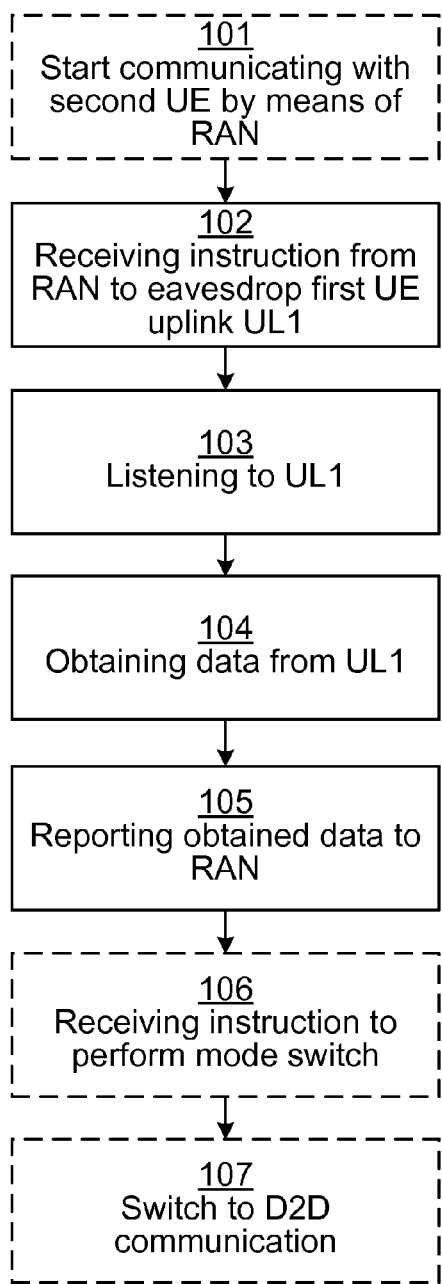
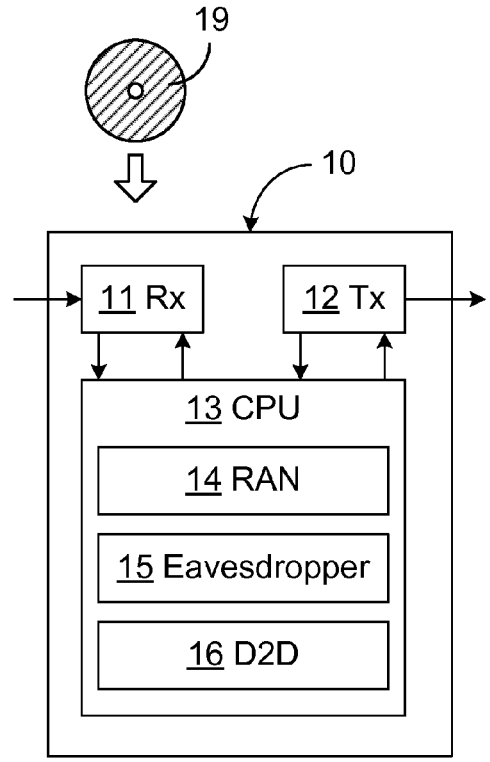
Fig. 4
Fig. 3

METHOD FOR ESTIMATING COMMUNICATION IN A DIRECT LINK

CROSS-REFERENCE TO RELATED APPLICATION

This application is a 35 U.S.C. § 371National Phase Entry Application from PCT/EP2012/075476, filed Dec. 14, 2012, and designating the United States.

TECHNICAL FIELD

The present disclosure relates to methods and apparatuses in a radio communication network. The invention relates to direct links between two user equipment units, so called device-to-device (D2D) communication, and especially for estimating the quality of communicating by means of a possible direct link.

BACKGROUND

In a typical cellular radio system, wireless terminals (also known as mobile stations and/or user equipment units (UEs)) communicate via a radio access network (RAN) to one or more core networks. User equipment units (UEs) may be, for example, mobile telephones ("cellular" telephones), desktop computers, laptop computers, and tablet computers, or stationary units, with wireless communication capability to communicate voice and/or data with a radio access network.

The radio access network covers a geographical area which is divided into cell areas, with each cell area being served by a base station, e.g., a radio base station (RBS), which in some networks is also called for example "NodeB" or (in Long Term Evolution (LTE)) eNodeB (eNB). A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

Specifications for an Evolved Universal Terrestrial Radio Access Network (E-UTRAN) are on-going within the 3rd Generation Partnership Project (3GPP). Another name used for E-UTRAN is the Long Term Evolution (LTE) Radio Access Network (RAN). LTE is a variant of a 3GPP radio access technology wherein the radio base station nodes are connected directly to a core network rather than to radio network controller (RNC) nodes. In general, in LTE the functions of a radio network controller node are performed by the radio base stations nodes. As such, the radio access network of an LTE system has an essentially "flat" architecture comprising radio base station nodes without reporting to radio network controller nodes.

The LTE standard is based on multi-carrier based radio access schemes, Orthogonal Frequency-Division Multiplexing (OFDM) in the downlink and Single-Carrier Frequency-Division Multiple Access (SC-FDMA) in the uplink. Orthogonal FDM's (OFDM) spread spectrum technique distributes the data over a large number of carriers that are spaced apart at precise frequencies. TD-LTE (time division LTE) is a variant of LTE where a single channel is used for transmissions in both directions, uplink and downlink, but divided in time.

GSM (Global System for Mobile communication) is an earlier well known system for mobile communication. The GSM originally used one dedicated frequency band for uplink communication from the user equipment, often called mobile device, to the radio access network and one dedicated frequency band for downlink communication from the radio access network to the mobile device. Such mobile devices where not adapted for direct communication from device-to-device. Mobile devices could, in addition to their GSM communication ability, be equipped with Bluetooth transceivers for close range communication from device-to-device. The user could then decide whether to call another mobile device (or UE) using the GSM cellular network, in which case communication where established via a base station of the GSM network, or to establish a direct communication using Bluetooth.

In later cellular radio access network systems, such as those of the 3rd generation, the available frequency spectra can be more freely employed and base stations and user equipment have been provided with transceivers that are able to transmit and receive in the same frequency band. This has made it possible to communicate using the same transceiver and frequency bands, from one user equipment to another, either in a two-hop fashion via the radio access network or, alternatively directly from device-to-device in a one-hop fashion. Direct communication in the same frequency band can be done also in GSM, but the mobile units was not prepared for it from the beginning.

A direct communication link between two UEs may be advantageous in lessen the traffic load of the radio access network. It would also be advantageous if the users need not have any special skill, or perform any specific operations, for entering a direct communication. Such direct communication may make radio resources usually employed between the radio access network and the UEs available for other communications. At close range direct communication D2D may be made at low power consumption and large capacity in relation to communication via the radio access network. However, establishing direct communication requires resources, and failure in the process of establishing direct communication need to be avoided so as not to counteract an overall purpose of economizing in radio resources.

SUMMARY

It is an objective of the present disclosure to at least alleviate a problem in the prior art in respect of radio resource management by providing methods of estimating the quality of a direct communication between two UEs.

For this purpose the invention provides a method, performed by a radio access network, for estimating a radio link quality of a direct link between a first user equipment and a second user equipment. The invention also provides a method performed in a user equipment, which method is used to monitor communication for the purpose of estimating communication in a possible direct link between a first user equipment and a second user equipment.

The method performed by a radio access network for estimating a radio link quality, is performed by a network node, such as a base station and/or a radio network controller, and, is performed during communication between the first user equipment and the second user equipment including employing a first uplink channel and a first downlink channel for the communication from the first user equipment to the second user equipment via the network. The communication preferably, also includes employing a second uplink channel and a second downlink channel for the communication from the second user equipment to the first user equipment.

The method includes instructing the second user equipment to eavesdrop the first uplink; receiving eavesdropping data, concerning the first uplink, from the second user equipment; obtaining data from the first uplink received directly from the first user equipment; and evaluating the first uplink reception of the second user equipment, which evaluation is based on the eavesdropping data from the second user equipment, and the data obtained from the first uplink from the first user equipment.

This evaluation gives an estimate of the quality of direct communication between the two user equipment units.

An advantage with such a method is that the user equipment need not perform an estimation of the quality of a direct link to the other user equipment. Such an additional direct link need not be created for the purpose of measuring, since the already established uplink is monitored.

The method of monitoring being performed by a user equipment is performed when the first user equipment communicate user data to the second user equipment via a cellular radio access network by means of a first uplink from the first user equipment to the cellular radio access network, and a first downlink from the cellular radio access network to the second user equipment, and the cellular radio access network use a at least one control channel for controlling the communication of the second user equipment. The method being performed by the second user equipment and comprises:

receiving an instruction from the cellular radio access network to eavesdrop the first uplink from the first user equipment; receiving transmissions on the first uplink; obtaining digital data from the received first uplink transmissions; and reporting to the cellular network, which reporting includes transmitting the obtained digital data.

A further object of the invention is to facilitate enabling of such a direct communication from device-to-device (D2D).

A further object of the invention is to facilitate a mode switch from communication between two UEs via a radio access network, into a direct D2D communication between the two UEs.

According to another aspect, the present disclosure relates to a communication node, such as serving radio base station (RBS) comprising a processor and a memory. The memory storing instructions that, when executed, cause the communication node, or radio base station, to obtain information of a possible direct link between a first and a second user equipment.

According to the invention a communication node for a cellular radio access network, such as a base station, is provided for communication between a first user equipment and a second user equipment. The communication node comprises an evaluator for enabling the communication node to perform a method of estimating a radio link quality of a possible direct link between the first user equipment and the second user equipment. The method of estimating a radio link quality of a possible direct link between the first user equipment and the second user equipment is performed during communication between the first user equipment and the second user equipment, which communication includes using a first uplink and a first downlink channel for the communication from the first user equipment to the second user equipment via the cellular radio access network. The communication node is adapted to perform the method steps of instructing the second user equipment to eavesdrop the first uplink, receiving eavesdropping data, concerning the first uplink, from the second user equipment, obtaining data from the first uplink received directly from the first user equipment, and evaluating the first uplink reception of the second user equipment, which evaluation is based on the eavesdropping data from the second user equipment, and the data obtained from the first uplink from the first user equipment.

According to another aspect, the present disclosure relates to a computer program product comprising computer-executable components for causing a communication node, especially a radio base station (RBS), to perform an embodiment of the method of the present disclosure when the computer-executable components are run on a processor comprised in the communication node or the RBS.

According to the invention a computer program for a communication node of a cellular radio access network is provided. The computer program comprising program code, which when run by the communication node causes the communication node to perform a method of estimating a radio link quality of a possible direct link between a first user equipment and a second user equipment, the method being performed during communication between the first user equipment and the second user equipment, which communication includes using a first uplink and a first downlink channel for the communication from the first user equipment to the second user equipment via the cellular radio access network, especially a base station. The method comprising the steps of instructing the second user equipment to eavesdrop the first uplink, receiving eavesdropping data, concerning the first uplink, from the second user equipment, obtaining data from the first uplink received directly from the first user equipment, and evaluating the first uplink reception of the second user equipment, which evaluation is based on the eavesdropping data from the second user equipment, and the data obtained from the first uplink from the first user equipment.

According to another aspect, the present disclosure relates to a user equipment.

According to the invention a user equipment for communicating in a cellular radio access network is provided. The user equipment is provided for communicating with other user equipment, the user equipment comprising an eavesdropper enabling the user equipment to perform a method of monitoring communication in the cellular radio access network for estimating communication in a possible direct link with an other user equipment, when communicating with the other user equipment via the cellular radio access network, during which communication the other user equipment communicate user data to the user equipment via the cellular radio access network by means of a first uplink from the other user equipment to the cellular radio access network, and a first downlink from the cellular radio access network to the user equipment. The method of monitoring comprises receiving an instruction from the cellular radio access network to eavesdrop the first uplink, receiving transmissions on the first uplink obtaining digital data from the received first uplink transmissions, and reporting to the cellular radio access network, which reporting includes transmitting the obtained digital data.

According to another aspect, the present disclosure relates to a computer program product for a user equipment.

According to the invention a computer program for a user equipment is provided. The user equipment is provided for communicating with other user equipment in a cellular radio access network, and the computer program comprising program code, which when run on the user equipment enables the user equipment to perform a method of monitoring communication in the cellular radio access network for estimating communication in a possible direct link with an other user equipment, when the user equipment communicate with the other user equipment via the cellular radio access network, during which communication the other user equipment communicate user data to the user equipment via the cellular radio access network by means of a first uplink from the other user equipment to the cellular radio access network, and a first downlink from the cellular radio access network to the user equipment. The method of monitoring communication comprises receiving an instruction from the cellular radio access network to eavesdrop the first uplink, receiving transmissions on the first uplink, obtaining digital data from the received first uplink transmissions, and reporting to the cellular radio access network, which reporting includes transmitting the obtained digital data.

According to another aspect, the present disclosure relates to computer program products comprising an embodiment of each one of the computer programs of the present disclosure, and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which:

FIG. 3 is a schematic flow chart of an embodiment of a method performed by user equipment.

FIG. 4 is a schematic illustration of an embodiment of user equipment in accordance with the present invention.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. Data transmitted from one device (such as user equipment, node or base station) to another device should in general be considered as received by the other device, and data received by one device from another device should be considered as having been transmitted by the other device. Even though such data may include errors.

Figure 1:
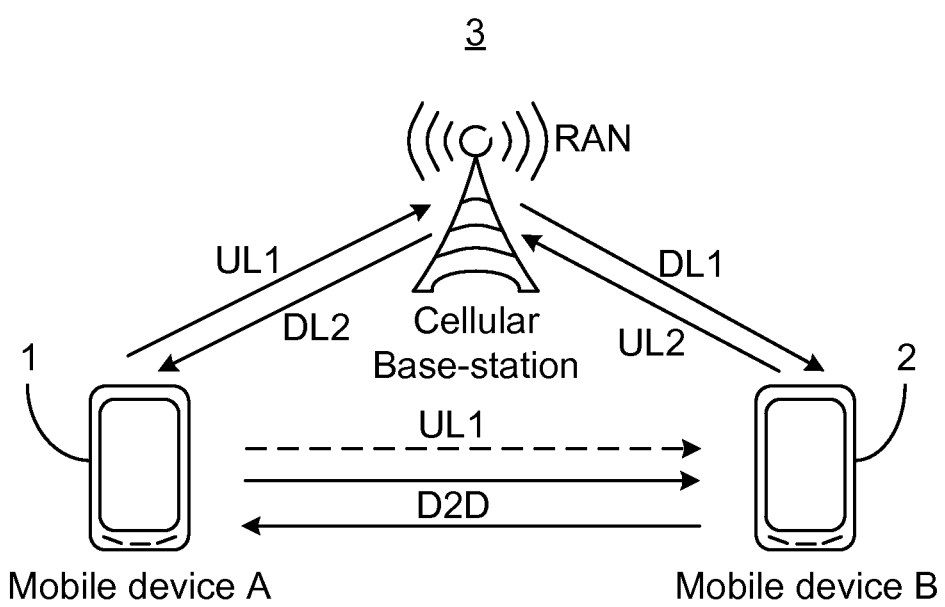
FIG. 1 is a schematic illustration of communication between to user equipment units.

FIG. 1 illustrates a first 1 and a second user equipment 2 (mobile device A and mobile device B, respectively) communicating with each other in a cellular radio access network, RAN, 3. Two different modes are illustrated. In a first communication mode the first 1 and second 2 user equipment communicate via a base station 3 of the cellular RAN. In the second mode, the first 1 and the second user equipment 2 communicate by means of a direct radio link from device-to-device (D2D). In the first mode, each user equipment unit 1, 2 communicates via the network by means of uplink and downlink radio channels. Each downlink and uplink comprises traffic channels and control channels, wherein user data exchanged between the first and the second user equipment 1, 2 are transferred by means of the traffic channels and the control channels are used to control the communication. For this purpose the control channels are used for example for controlling handover between base stations, or between different sectors of a base station, and for example for transferring coding information, power control instructions and measurements. Moreover the control channels may be used for instruction one, or both, of the user equipment units 1, 2 to switch mode from communication via the cellular RAN to direct communication from device-to-device. During communication in the first mode, the first user equipment 1 transmit user data by means of a first uplink UL1 to the base station 3, which user data is subsequently transferred from the base station 3 to the second user equipment 2 by means of a first downlink DL1. In a similar way, user data from the second user equipment 2 is transferred to the first user equipment 1 by means of a second uplink UL2 to the base station 3 and a second downlink DL2 from the base station 3 to the first user equipment 1. The second user equipment 2 is also adapted for listening in to the transmissions on the first uplink UL1, as illustrated by the broken line UL1 and receive transmissions on the first uplink UL1 directly from the first user equipment 1. The second user equipment 2 is further adapted for at least partly decoding the transmissions on to the first uplink UL1, and eavesdrop data from the first uplink UL1. This is illustrated in more detail in FIG. 2. Also the first user equipment 1 is adapted for listening in (not illustrated) and eavesdrop on uplink transmissions from the second user equipment 2 to the base station 3.

Figure 2:
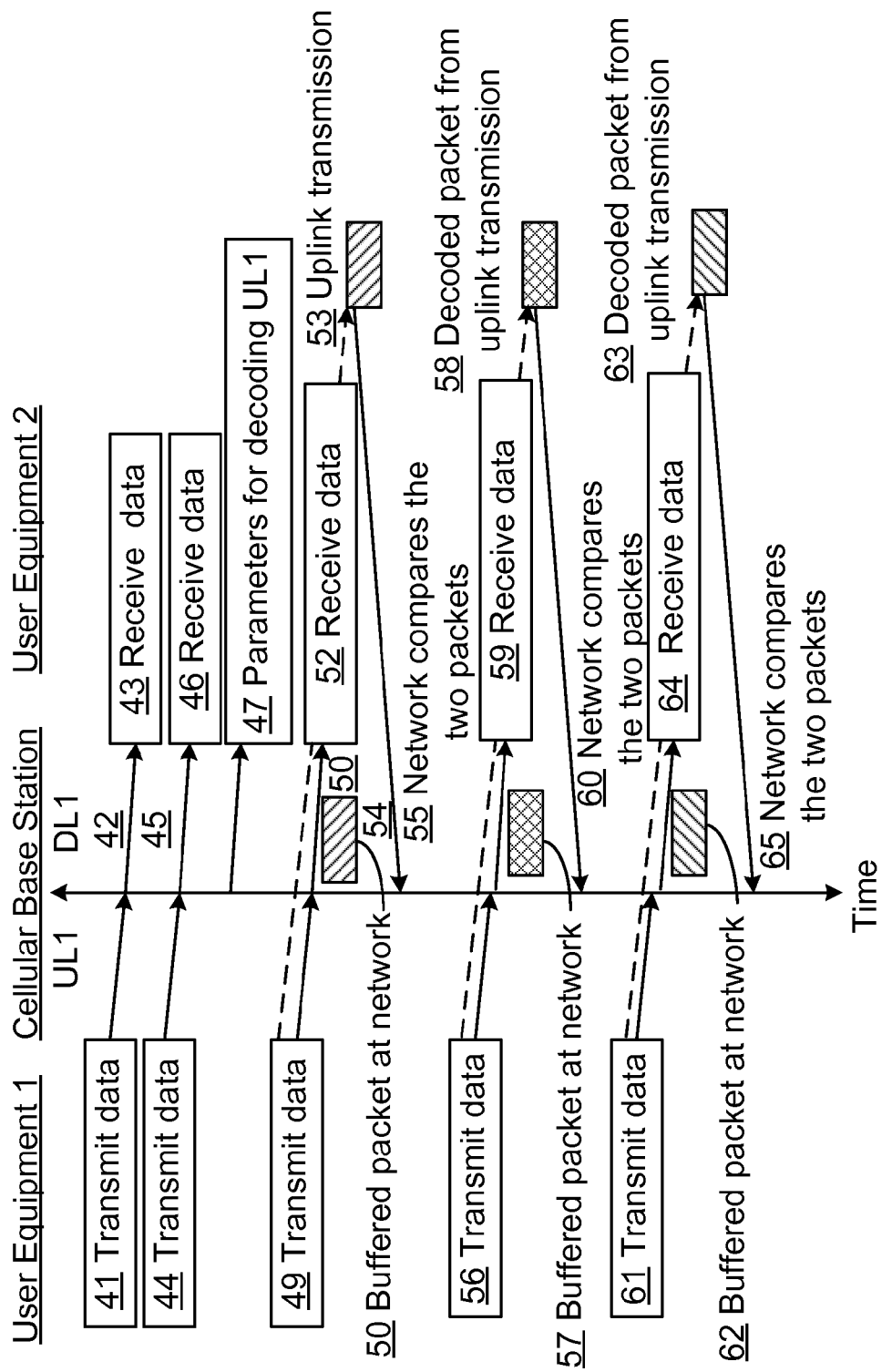
FIG. 2 is a schematic flow chart of an embodiment of a method.

FIG. 2 illustrates a communication session in accordance with the first mode of communication wherein the first 1, and second user equipment 2 communicate via the cellular base station of the RAN 3. The first user equipment 1 transmit traffic/user data, step 41, via the first uplink UL1 to the base station 3 that re-transmits the data, step 42, to the second user equipment 2, which receives, step 43, the incoming data. During the illustrated on-going communication the first user device 1 transmit more data, step 44 via the base station 3, which re-transmits the data 45 to the second user equipment 2, which receives the incoming data, step 46. In the next step the base station 3 instructs the second user equipment 2 to eavesdrop data transmitted on the first uplink by transmitting, in step 47, decoding parameters to the second user equipment 2, which decoding parameters enable the second user equipment to listen in on the first uplink and obtain the data from the first uplink.

The decoding parameters include an identification of the first uplink and other parameters for decoding the first uplink, such as modulation-scheme, code-rate and/or encryption keys. The purpose is to enable the second user equipment 2 to obtain a string of bits so that the quality of the transmission on the first uplink UL1 subsequently can be estimated. It is preferred to only transmit parameters that allow a partial decoding of the data on the first uplink. Such a partial decoding provides some security in handling the data and also facilitates the decoding. The decoding will then result in an intermediate form of the transmitted user data from the first user equipment. It is, however, also possible to transmit all parameters needed for a total decoding of the user data into final user data.

The next time the first user equipment 1 transmit data on the uplink, step 49, the base station 3 decodes and buffer the decoded data, in step 50 and retransmit the data, step 51, for subsequent reception, in step 53, by the second user equipment. During the uplink transmission from the first user equipment 1, the second user equipment 2 receives and eavesdrop, step 53, the data directly from the first uplink, using the previously received decoding parameters for obtaining the data. In the next step, the second user equipment reports, step 54, the obtained data to the base station 3. The base station 3 subsequently compare, step 55, the buffered data with the data obtained by and received from the second user equipment 2.

This method of obtaining uplink data directly by the second user equipment and evaluating the obtained data by the base station 3, performed by comparing the buffered data from the uplink with the obtained data from the second user equipment, is repeated. Thus, the first user equipment transmit a further set of data, step 56, which is received, decoded and buffered by the base station, step 57, re-transmitted to the second user equipment, step 59, which second user equipment also eavesdrop, step 58, the first uplink directly. The data obtained during the eavesdropping is reported (transmitted) to the base station that evaluates the direct link by comparing the further set of buffered data with the further set of obtained data, step 60. FIG. 2 illustrates how the process is repeated once again with data transmission, step 61, from the first user equipment on the first uplink. Reception, decoding and buffering at the base station, step 62, eavesdropping of the first uplink UL1 at the second user equipment, step 63, reporting the data obtained during the eavesdropping, step 64 and evaluating the radio link, step 65, by comparing the buffered data (of step 62) with the eavesdropped data (obtained in step 63, and reported to the base station in step 64).

Further details of embodiments of the user equipment and the base station will be given with reference to FIGS. 3-6.

When the GSM system was created it had different frequency bands for the uplink and the downlink communication. One timeslot was used in the downlink frequency band and one timeslot was used in the uplink frequency band. In later systems like GPRS and EDGE, the uplink and downlink could be asymmetric so that a plurality of downlink time slots where used in combination with a single timeslot for the uplink. Mobile communications system has been developed further so that methods for dynamic allocation of uplink and downlink is possible, wherein the downlink and uplink can be allocated to the same frequency bands and channels are freely allocated upon need. UMTS (Universal Mobile Telecommunications System) is a third generation system that allows the use of the same frequency band for uplink and downlink communication. Thus, both asymmetric downlink and uplink has been made possible together with sharing of frequency bands between uplink and downlink.

Implementation of the invention is easier in such systems wherein the user equipment already is able to receive both uplink and downlink transmissions. However, the invention may be employed in other systems provided the user equipment is enabled for such dynamic allocation of channels to the uplink and downlink.

Examples of systems, wherein user equipment can communicate using the same frequency band for receiving downlink communication and transmitting uplink communication, include the TD-LTE and TD-SCDMA (Time Division Synchronous Code Division Multiple Access). Both these systems use, so called, Time Division Duplex (or TDD) for scheduling the communication. The most straightforward implementation may be an implementation in a network node or base station and user equipment adapted for TDD communication in accordance with such systems and protocols.

FIG. 3 illustrates monitoring communication on an uplink by the second user equipment. A communication session, such as the one illustrated in FIGS. 1 and 2, is started (101). The user equipment communicates with an other (referred to as the first in FIGS. 1 and 2) user equipment via a radio access network. The communication includes transmissions of user data from the other user equipment on a first uplink UL1 to a node of the radio access network, and the subsequent transmission of the user data to by means of a first downlink DL1 to the (second) user equipment. During this communication the (second) user equipment exchange control data with the node of radio access network by means control channels.

In step 102, the (second) user equipment receives an instruction from the radio access network to eavesdrop uplink transmissions of user data from the other (or first) user equipment. The eavesdropping instruction includes decoding parameters that are received by the (second) user equipment. The decoding parameters contain decoding parameters for decoding the first uplink and enable the (second) user equipment to decode the first uplink. The parameters may include code rate, modulation scheme, spreading code and encryption key of the first uplink. The parameters enable the (second) user equipment to decode the first uplink into an intermediate form of the user data at least, but may alternatively enable a complete decoding into the user data. The eavesdropping instruction also includes an identification of which data transmissions of the first uplink that should be eavesdropped. This identification may indicate a time period, or a plurality of time periods, during which the first uplink should be eavesdropped. The identification may indicate specific time slots of the first link transmissions that should be eavesdropped, and/or identify a resource block of the first uplink to be eavesdropped.

In the next step, 103, the (second) user equipment starts the eavesdropping by listening into and receive the transmissions of user data, from the other (first) user equipment, on the first uplink. Thus, the (second) user equipment listens to the uplink transmissions as identified in the eavesdropping instruction.

The eavesdropping is continued in step 104 by obtaining the user data from the received transmissions of the first uplink. The user data is obtained by means of the decoding parameters received through the eavesdropping instruction. The decoding of the received user data provides digital data as a sequence of bits.

In an embodiment, the obtained data may be combined into a compact form, using for example, checksums, CRC (cyclic redundancy check) and/or hash-values. In such a case the node, or base station, will perform the algorithm for compacting the data to the same format so that a comparison can be made.

The data obtained from the eavesdropping is subsequently reported to the node of the radio access network, in step 105. The monitoring of the first uplink may end by this transmission, or be repeated by performing the steps of listening 103, data obtaining 104 and reporting 105.

In the mean time the node of the RAN has obtained a corresponding set of the user data, which has been stored for enabling comparing the user data obtained by the eavesdropping and user data received directly from the other (or first) user equipment. The comparison of the data sets results in an evaluation of the radio link quality between the (second) user equipment and the other (first) user equipment. If the evaluation results in the fulfilment of a quality criteria, e.g. the two sets of data are the same to a certain extent, the node may instruct the (second) user equipment to switch from the first communication mode, i.e. the communication via the network, to a second mode of communication; the device-to-device communication. Thus, the method of monitoring the radio link may be followed by a method of switching mode into direct device-to-device communication.

An instruction to perform a mode switch into device-to-device communication may therefore be received by the second user equipment, in step 106. This instruction may include further communication parameters for the second user equipment to be used for direct reception and decoding of user data from the first user equipment on the channel that hitherto has been used as the first uplink. The instruction may, alternatively, include an identification of another channel and parameters for decoding that channel. The instruction may also include an identification of a channel that should be used for transmissions to the other (first) user equipment.

The (second) user equipment performs a switch into device-to-device communication, in step 107, using the channels provided for this communication as received in the mode switch instruction.

During the device-to-device communication, the user equipment, or both user equipment units, may continue to report measurements to the node of the radio access network. Such reporting may include reception of for example broadcasts from several nodes of the radio access network. The user equipment may also initiate measurements of the communication with the first user equipment in the device-to-device mode and report such measurements, or establish and sending quality reports based on such measurements, to the node of the network.

The user equipment includes a combination of hardware and software for performing its functions, including monitoring and mode switching, which includes for example a micro processor, memory and a computer program executed by the micro processor. When implementing the invention, the extent to which hardware and software are modified, and how the implementation is divided between the hardware and software, depends, as noted by a person skilled in the art, on which type of user equipment is modified, and for which radio access technology it is adapted.

A simplified illustration of the user equipment for illustrating an embodiment of a user equipment in accordance with the invention is provided in FIG. 4. The illustrated components are used for enabling the user equipment to perform the methods described in FIGS. 2 and 3. The FIG. 4 illustrate main features of the user equipment for illustrating mainly the difference of the user equipment compared to prior art. The user equipment 10 includes radio communication means including a transmitter 11, a receiver 12 and a control unit (CPU), or controller, 13. The controller 13 comprises a cellular radio communicator 14 for communicating by means of a radio access network. The controller also comprises a device-to-device (D2D) communicator 16 enabling the user equipment to communicate in a direct mode with an other user equipment. Further, the user equipment comprises an eavesdropper 15 that enables the user equipment to perform the monitoring of the uplink from the other user equipment. The cellular radio communicator 14, the eavesdropper 15 and the device-to-device communicator 16 can be added to a user equipment to enable the user equipment to perform the method and functions as described herein. In user equipment units already capable of performing communication in a network mode and in a device-to-device mode, the eavesdropper may be added as a software for enabling monitoring of an uplink in accordance with the invention. FIG. 4 illustrates a computer program product 19 (illustrated as a disc) that may include an eavesdropper program that enables the user equipment to perform an eavesdropping operation by means of its cellular radio communicator 14 and its receiver 11 and transmitter 12. The computer program product 19 may also include other features used by a user equipment of the invention, such as providing cellular radio communication, device-to-device communication and switching between these modes of communication.

Figure 5A:
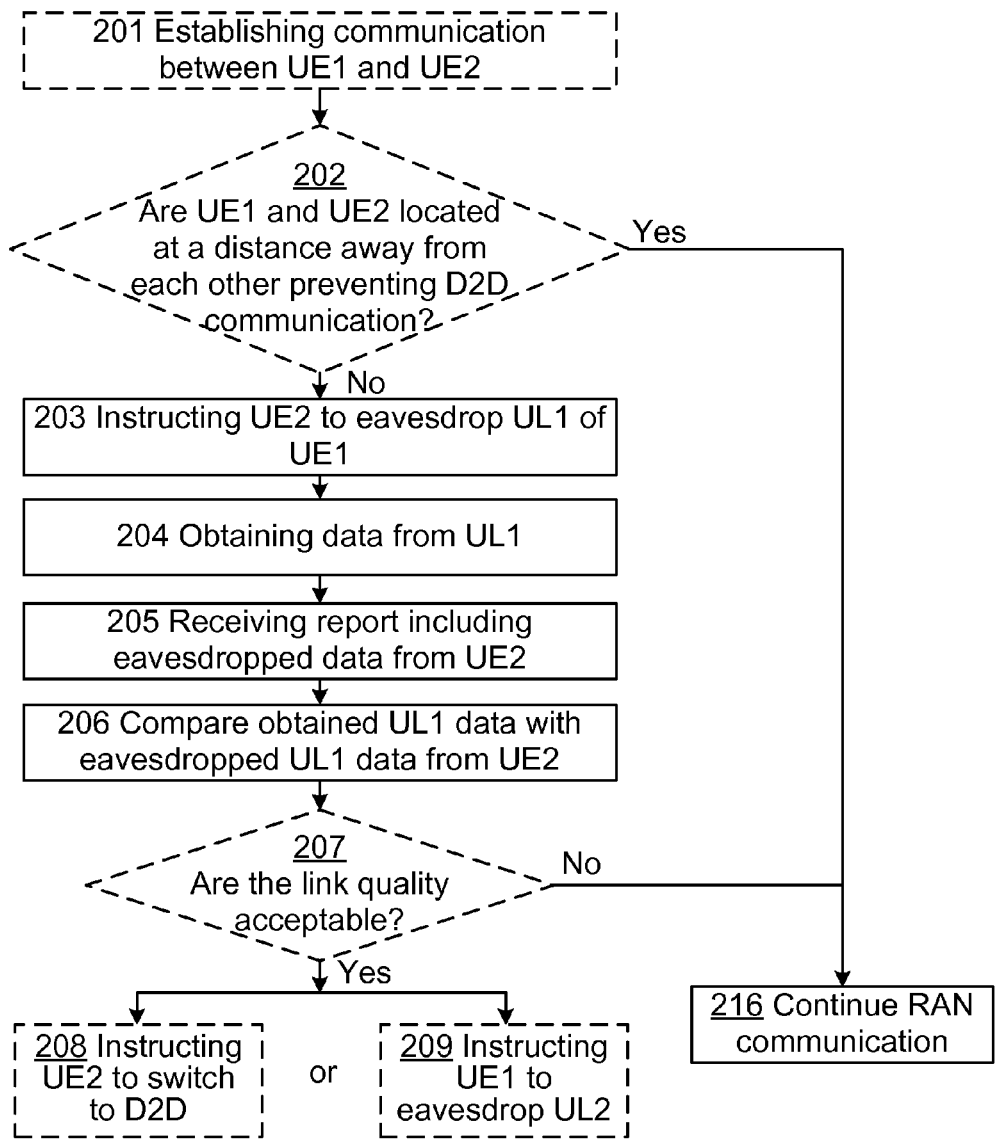
FIG. 5A and FIG. 5B is a schematic flow chart of an embodiment of a method performed by the radio access network in accordance with the present invention.
Figure 5B:
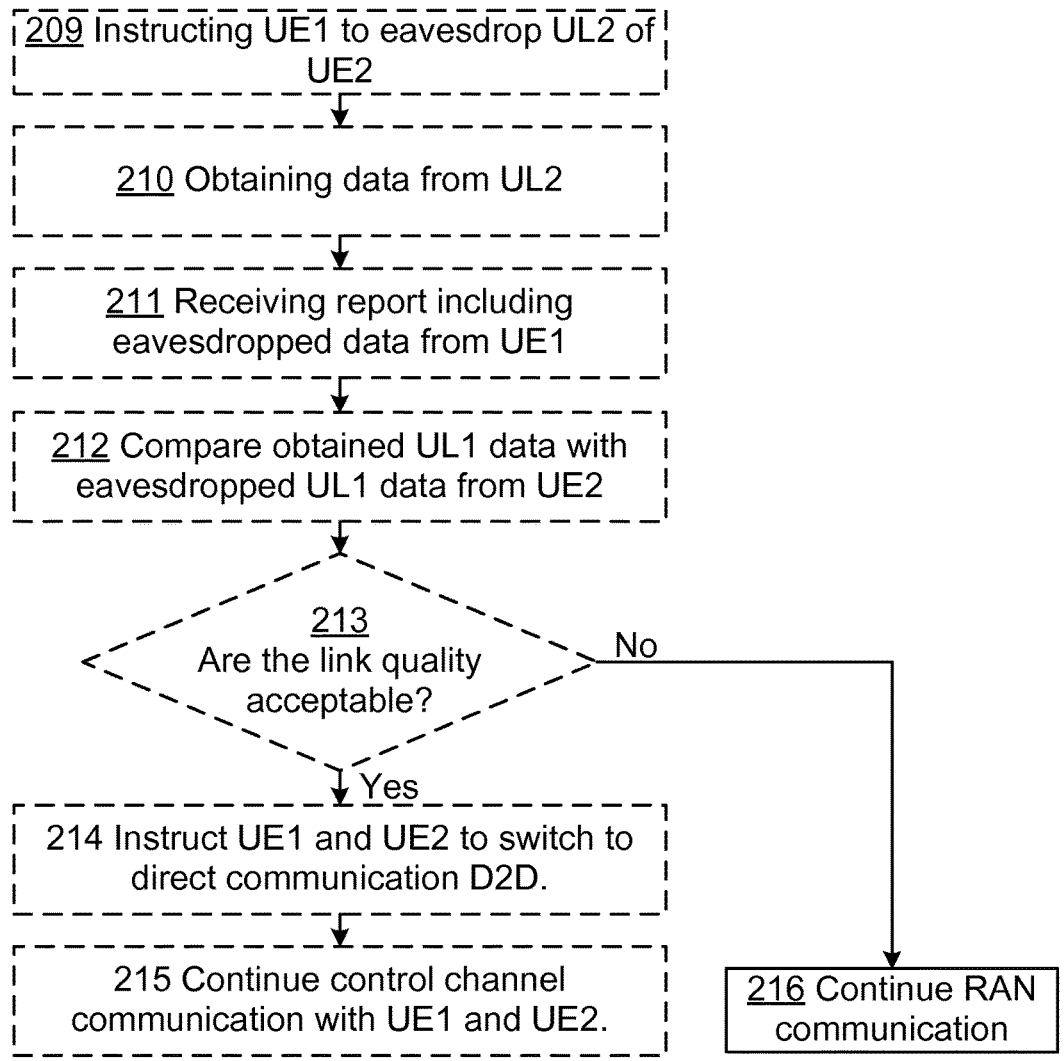

FIGS. 5A and 5B illustrates methods performed by at least one network node to provide to functions of the invention. The illustrated method starts in step 201 with establishing communication between a first UE1 and a second user equipment UE2. In accordance with an embodiment of the invention, the method continues with a step of evaluating whether the distance between the first UE1 and the second user equipment UE2 is close enough to make it possible to communicate in a device-to-device mode. This is done in step 202 by evaluating if the distance between the user equipment units UE1, UE2 is so large that device-to-device communication can be excluded. If the distance is too large the method may continue communicating, step 216, in network mode. If the distance is not considered too large, the network node determines the possibility of having a pair of user equipment units suitable for device-to-device communication.

To further evaluate if such D2D communication is possible and possibly instruct the user equipment units to switch to D2D communication, the node continues with step 203 by instructing one of the user equipment, in the illustrated case UE2, to eavesdrop uplink transmissions UL1 from the other user equipment UE1.

The communication node also, in step 204, obtains data directly from the first uplink UL1.

The instruction to eavesdrop, in step 203, includes indication of which data to eavesdrop, and how the user equipment should handle the receptions of the uplink. The purpose is to perform the same data transformations on the same data in the communication node, so that the same result is determined.

When the instruction received in the user equipment, includes an indication of a time period, or a plurality of time periods, during which the first uplink should be eavesdropped, as described in relation to FIG. 3 the communication node obtain data from the first uplink during the same period(s) and time slots. Also the communication node uses the same decoding parameters when obtaining data, in step 204, as it includes in the instruction of step 203. Thus, such parameters may include code rate, modulation scheme, spreading code and encryption key of the first uplink. The parameters enable decoding the first uplink into an intermediate form of the user data at least, but may alternatively enable a complete decoding into the user data. Moreover, the eavesdropping instruction, of step 203, also includes an identification of which data transmissions of the first uplink that should be eavesdropped, and this identification may, in addition to indicating a time period, or a plurality of time periods, during which the first uplink should be eavesdropped, indicate specific time slots of the first link transmissions that should be eavesdropped, and/or identify a resource block of the first uplink to be eavesdropped.

In an embodiment, the obtained data, of step 204 and by the user equipment in step 104 of FIG. 3, may be combined into a compact form. Such compact form may be provided by using checksums, CRC (cyclic redundancy check) and/or hash-values. In such a case the communication node and the user equipment is adapted to perform an algorithm for compacting the data to the same format so that a comparison can be made.

In the next step, 205, the communication node receiving a report from the second user equipment UE2, which report includes the data obtained by the second user equipment UE2 during the eavesdropping.

The communication node compares, in step 206, the user data obtained directly from the first uplink UL1 with the eavesdropped of the first uplink UL1 that has been received in the report from the second user equipment UE2.

In step 207 the communication node evaluates the comparing of data of step 206 and determines if the link quality is acceptable. If the link quality is not acceptable, the communication node decodes that the two user equipment units should continue to communication in the first mode by means of the cellular radio access network.

If the communication node considers the link quality to be acceptable it may instruct the second user equipment UE2 to switch into the second mode of device-to-device communication, step 208. Alternatively, the communication node may instruct the first user equipment UE1 to eavesdrop the second uplink UL2 from the second user equipment UE2, step 209.

The method continues in accordance with FIG. 5B if the communication node decides to instruct the first user equipment UE1 to eavesdrop.

The instruction to perform a mode switch into device-to-device communication, of step 208, may include further communication parameters for the second user equipment to be used for direct reception and decoding of user data from the first user equipment on the channel that hitherto has been used as the first uplink. The instruction may include an identification of another channel and parameters for decoding that channel. The instruction may also include an identification of a channel that should be used for transmissions to the other (first) user equipment.

FIG. 5B describes a scenario when the communication node instructs also the first user equipment to eavesdrop, to be able to make a better estimate of a possible direct device-to-device communication mode. The process is similar to the eavesdropping of the second user equipment, as described in 5A, but concerns the second uplink UL2. Therefore, the decoding parameters, the time periods and timeslots used considers the second uplink. FIG. 5B is therefore only described very briefly.

The communication node instructs the first user equipment UE1 to eavesdrop the second uplink UL2 used by the second user equipment for transmitting user data to the first user equipment via the radio access network.

The communication node obtains data directly from the second uplink UL2, instep 210, using decoding parameters it has instructed the first user equipment to use. The same data is obtained as the communication node instructs the first user equipment UE1 to obtain in step 209.

The communication node receives eavesdropped user data in a report from the first user equipment UE1, in step 211.

The communication node compares the user data obtained directly from the second uplink UL2, with the data received in the report from the first user equipment UE1.

In step 213, the communication node determines if the quality of reception is acceptable. If not, it decides that the user equipment units should continue communication in the first mode via the radio access network (step 216).

If the quality is acceptable, the communication node, in step 214, instruct the first user equipment UE1 and/or the second user equipment to switch to device-to-device communication. This instruction may include indications of a channel that should be used for the device-to-device communication.

The communication node may continue to control channel communication with one or both of the first user equipment UE1 and the second user equipment UE2, in step 216. Such communication may be used by the communication node to determine if the user equipment units UE1, UE2 should switch back to the first communication mode via the radio access network.

Figure 6:
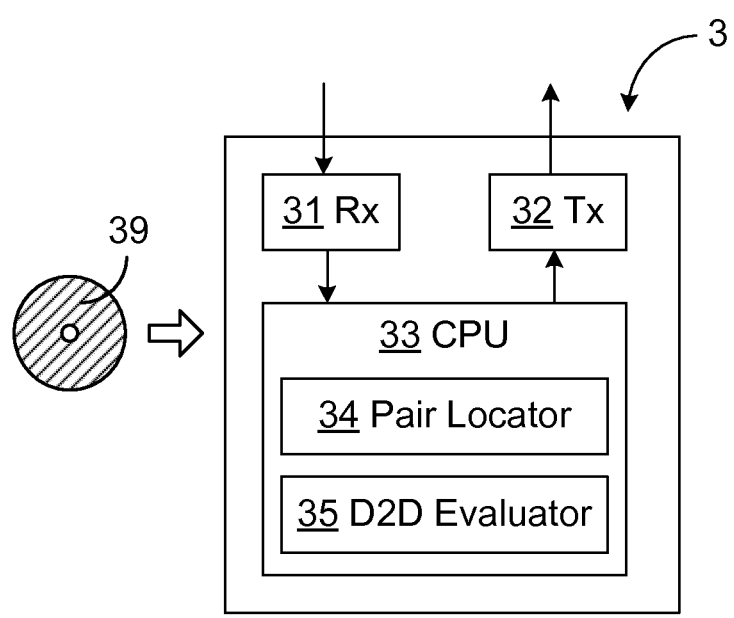
FIG. 6 is a schematic illustration of an embodiment of a network node in accordance with the present invention.

FIG. 6 is a simplified illustration of a node, in the form of a base station, of a cellular radio access network. The base station includes a receiver 31, a transmitter 32 and a control unit, CPU 33. The base station has been provided with a pair locator 34 and a direct link evaluator, the D2D evaluator 35, for enabling the base station to perform the methods of evaluating a radio link for device-to-device communication in accordance with the invention. Thus, the control unit 33 of the base station especially includes a pair locator 34 and a D2D evaluator 35 that enables the base station 3 to perform the method described in FIGS. 5A and 5B.

In accordance with the invention described in the summary and exemplified in the figures a number of embodiments can be provided and also be further specified. Such embodiments and further specifications are disclosed in the following.

Embodiments of the Methods Performed by Communication Nodes

A method of estimating a radio link quality of a possible direct link between a first user equipment (1) and a second user equipment (2) performed by at least one communication node of a cellular radio access network (3) has been provided, which method comprises instructing the second user equipment (2) to eavesdrop the first uplink (UL1), receiving eavesdropping data, concerning the first uplink (UL1), from the second user equipment (2), obtaining data from the first uplink (UL1) received directly from the first user equipment (1), and evaluating the first uplink (UL1) reception of the second user equipment (2), which evaluation is based on the eavesdropping data from the second user equipment (2), and the data obtained from the first uplink from the first user equipment (1).

In an embodiment, the step of instructing the second user equipment (2) includes providing the second user equipment (2) with an identification of the data to be eavesdropped in the first uplink (UL1).

In a further embodiment, the identification of data preferably indicates a time period or time-slots of the first uplink and/or a physical resource block of the first uplink (UL1).

In an embodiment, the step of instructing includes providing the second user equipment (2) with decoding parameters that enable decoding of the second uplink.

In a further embodiment, the decoding parameters includes at least one parameter from a group of parameters including code-rate of second uplink, modulation scheme of the second uplink and encryption key of the second uplink. Preferably including any combination of two or more parameters of the said group.

In an embodiment, the evaluating step includes determining if a direct link between the first (1) and second user equipment (2) fulfils a quality criteria. A quality criteria such as determining correct reception of data at a larger extent than a minimum ratio or level.

In an embodiment, the step of instructing the second user equipment (2) includes instructing the second user equipment to report back eavesdropped data to the network.

In an embodiment, the method includes buffering the data obtained from the first uplink (UL1) from the first user equipment (1), and the evaluating step includes comparing the received eavesdropped uplink data with the buffered data.

An embodiment includes, prior to the step of instructing the second user equipment (2) to eavesdrop the first uplink (UL1), investigating whether the geographical distance between the first (1) and second user equipment (2) may be short enough for direct link communication. Such a decision can be based on in which cells the mobiles are located, in the same cell or adjacent cells, and if the cells are to far away, also on information received from the mobiles such as received broadcasts from base stations or geographical coordinates from for example GPS of at least one or each mobile.

Embodiments are provided wherein the step of investigating the geographical distance is based on at least one cell identity, for example of small cells like pico cells of for example an LTE system that may be close enough to enable direct link communication, or a pico cell being overlapped or included within a macro or micro cell.

In an embodiment the step of investigating the geographical distance is based on at least one sector of a cell, such as two adjacent sectors of one cell or a sector of one cell and another cell, such as a pico cell.

In an embodiment the step of investigating the geographical distance is based at least in part on GPS data retrieved from one or both of the first and second user equipment, in which case such GPS location data may be retrieved by instructing the user equipment to report such GPS location data to the network.

Also, the user equipment may be instructed to report cell identities of the serving cell for example providing such instructions for each user equipment.

In an embodiment the communication during which the method is performed includes using a second uplink channel (UL2) and a second downlink channel (DL2) for the communication from the second user equipment (2) to the first user equipment (1) via the radio access network, and the method further comprises instructing the first user equipment (1) to eavesdrop the second uplink (UL2), receiving eavesdropping data, concerning the second uplink (UL2), from the first user equipment (1), obtaining data from the second uplink (UL2) received directly from the second user equipment (2), and the evaluating further includes evaluating the second uplink (UL2) reception of the first user equipment (1) based on the eavesdropping data from the first user equipment (1), and the data obtained from the second uplink from the second user equipment (2).

In an embodiment the method further comprises a step of buffering data of the first uplink, and comparing the buffered data of the first uplink with the data received from the second user equipment concerning the eavesdropping of the first uplink, and/or including providing decoding parameters of the first uplink to the second user equipment, and/or data identifying which first uplink data to be eavesdropped, and/or instructing the second user equipment to report back to the network.

An embodiment includes a method of providing a direct communication link between a first (1) and a second user equipment (2), the method being performed in a node of a cellular radio access network (3), and includes the method of estimating a radio link quality, or any embodiment of this estimating method, and further includes instructing the second user equipment (2) to communicate directly with the first user equipment (1) using the direct radio link.

In an embodiment the method of providing a direct communication link, further includes instructing the first user equipment (1) and/or the second user equipment (2) to report data about the direct radio link to the network.

In an embodiment the method of providing a direct communication link includes instructing the first user equipment (1) and/or the second user equipment (2) to report data about radio communication resources of the radio access network, such as resource data received in broadcasts from base stations of the cellular radio access network (3), to the node of the radio access network.

Methods Performed by User Equipment

A method of monitoring communication in a cellular radio access network (3) for estimating communication in a possible direct link between a first user equipment (1) and a second user equipment (2) has been provided, which method is performed by the second user equipment (2) and comprises receiving an instruction from the cellular radio access network (3) to eavesdrop the first uplink (UL1), receiving transmissions on the first uplink (UL1), obtaining digital data from the received first uplink (UL1) transmissions, and reporting to the cellular radio access network (3), which reporting includes transmitting the obtained digital data.

Preferably, the cellular radio access network (3) use a at least one control channel for controlling the communication of the second user equipment (2).

In an embodiment, the step of receiving an instruction includes receiving decoding parameters that enable decoding of the first uplink (UL1), and the step of obtaining digital data includes decoding the first uplink (UL1).

In an embodiment, the decoding parameters includes at least one parameter from a group of parameters including a code-rate of first uplink, a modulation scheme of the first uplink and an encryption key of the first uplink. Preferably any combination of two or more parameters of the said group.

In an embodiment, the step of receiving an instruction includes receiving an identification of the data to be eavesdropped in the first uplink (UL1).

In a further embodiment the identification of data preferably indicates a time period or time-slots of the first uplink and/or a physical resource block of the first uplink.

In an embodiment, the communication comprises decoding data received through the first downlink (DL1) in at least two steps including decoding the data into an intermediate form of digital data and further into the user data, wherein the step of obtaining digital data from the received first uplink (UL1) transmissions comprises decoding the received uplink transmissions into digital data of the intermediate form of digital data. Preferably this is not final user data.

In an embodiment, the reporting to the cellular radio access network being made by means of a control channel.

Embodiments of Communication Nodes

A communication node for a cellular radio access network, such as a base station, has been provided for communication between a first user equipment (1) and a second user equipment (2). The communication node comprises a control unit for estimating a radio link quality of a possible direct link between the first user equipment (1) and the second user equipment (2), the control unit (33) comprises an evaluator (35) being adapted to perform a method of estimating a radio link quality of a possible direct link between the first user equipment (1) and the second user equipment (2) and which-the method of estimating comprises instructing the second user equipment (2) to eavesdrop the first uplink (UL1), receiving eavesdropping data, concerning the first uplink (UL1), from the second user equipment (2), obtaining data from the first uplink (UL1) received directly from the first user equipment (1), and evaluating the first uplink (UL1) reception of the second user equipment (2), which evaluation is based on the eavesdropping data from the second user equipment (2), and the data obtained from the first uplink from the first user equipment (1).

In an embodiment, the step of instructing the second user equipment (2) includes providing the second user equipment (2) with an identification of the data to be eavesdropped in the first uplink (UL1).

In an embodiment, the identification of data preferably indicates a time period or time-slots of the first uplink and/or a physical resource block of the first uplink (UL1).

In an embodiment, the step of instructing includes providing the second user equipment (2) with decoding parameters that enable decoding of the second uplink.

In an embodiment, the decoding parameters includes at least one parameter from a group of parameters including code-rate of second uplink, modulation scheme of the second uplink and encryption key of the second uplink.

In an embodiment, the evaluating step includes determining if a direct link between the first (1) and second user equipment (2) fulfils a quality criteria.

In an embodiment, the step of instructing the second user equipment (2) includes instructing the second user equipment to report back eavesdropped data to the network.

In an embodiment, the communication node is adapted to buffer the data obtained from the first uplink (UL1) from the first user equipment (1), the evaluating step includes comparing the received eavesdropped uplink data with the buffered data.

In an embodiment, the communication node further includes a user equipment locator (34) for selecting a possible direct link for the radio link quality estimation, the user equipment locator (34) being provided to investigate, during communication between the first (1) and the second user equipment (2) whether the geographical distance between the first (1) and second user equipment (2) may be short enough for direct link communication.

Embodiments of User Equipment

A user equipment (2) for communicating in a cellular radio access network has been provided, which user equipment is provided for communicating with other user equipment (1), the user equipment (2) comprises an eavesdropper (15) enabling the user equipment to perform a method of monitoring communication in the cellular radio access network (3) for estimating communication in a possible direct link with an other user equipment (1), when the user equipment communicate with the other user equipment via the cellular radio access network. The method of monitoring performed by the user equipment comprises receiving an instruction from the cellular radio access network (3) to eavesdrop the first uplink (UL1), receiving transmissions on the first uplink (UL1), obtaining digital data from the received first uplink (UL1) transmissions, and reporting to the cellular radio access network (3), which reporting includes transmitting the obtained digital data.

In an embodiment, the step of receiving an instruction includes receiving decoding parameters that enable decoding of the first uplink (UL1), and the step of obtaining digital data includes decoding the first uplink (UL1).

In a further embodiment, the decoding parameters includes at least one parameter from a group of parameters including a code-rate of first uplink, a modulation scheme of the first uplink and an encryption key of the first uplink.

In an embodiment, the step of receiving an instruction includes receiving an identification of the data to be eavesdropped in the first uplink (UL1).

In a further embodiment the identification of data preferably indicates a time period or time-slots of the first uplink and/or a physical resource block of the first uplink.

In an embodiment, the communication comprises decoding data received through the first downlink (DL1) in at least two steps including decoding the data into an intermediate form of digital data and further into the user data, wherein the step of obtaining digital data from the received first uplink (UL1) transmissions comprises decoding the received uplink transmissions into digital data of the intermediate form of digital data.

In an embodiment, the reporting to the cellular radio access network being made by means of a control channel.

Embodiments of Computer Programs for Communication Nodes

A computer program (39) for a communication node (3) of a cellular radio access network has been provided, which computer program comprises program code, which when run by the communication node causes the node to perform a method of estimating a radio link quality of a possible direct link between a first user equipment (1) and a second user equipment (2). The method of estimating a radio link quality comprising the steps of instructing the second user equipment (2) to eavesdrop the first uplink (UL1), receiving eavesdropping data, concerning the first uplink (UL1), from the second user equipment (2), obtaining data from the first uplink (UL1) received directly from the first user equipment (1), and evaluating the first uplink (UL1) reception of the second user equipment (2), which evaluation is based on the eavesdropping data from the second user equipment (2), and the data obtained from the first uplink from the first user equipment (1).

In an embodiment the computer program further comprises program code, which when run by the communication node causes the communication node to perform the instructing of the second user equipment (2) including providing the second user equipment (2) with an identification of the data to be eavesdropped in the first uplink (UL1).

In a further embodiment, the identification of data preferably indicates a time period or time-slots of the first uplink and/or a physical resource block of the first uplink (UL1).

In an embodiment, the step of instructing includes providing the second user equipment (2) with decoding parameters that enable decoding of the second uplink.

In a further embodiment, the decoding parameters includes at least one parameter from a group of parameters including code-rate of second uplink, modulation scheme of the second uplink and encryption key of the second uplink.

In an embodiment, the evaluating step includes determining if a direct link between the first (1) and second user equipment (2) fulfils a quality criteria.

In an embodiment, the step of instructing the second user equipment (2) includes instructing the second user equipment to report back eavesdropped data to the network.

An embodiment includes buffering the data obtained from the first uplink (UL1) from the first user equipment (1), the evaluating step includes comparing the received eavesdropped uplink data with the buffered data.

An embodiment includes, prior to the step of instructing the second user equipment (2) to eavesdrop the first uplink (UL1), investigating whether the geographical distance between the first (1) and second user equipment (2) may be short enough for direct link communication.

In an embodiment the computer program, further comprises program code, which when run by the communication node during communication that includes using a second uplink channel (UL2) and a second downlink channel (DL2) for the communication from the second user equipment (2) to the first user equipment (1) via the radio access network enable the communication causes the communication node to perform the method steps of instructing the first user equipment (1) to eavesdrop the second uplink (UL2), receiving eavesdropping data, concerning the second uplink (UL2), from the first user equipment (1), obtaining data from the second uplink (UL2) received directly from the second user equipment (2), and the evaluating further includes evaluating the second uplink (UL2) reception of the first user equipment (1) based on the eavesdropping data from the first user equipment (1), and the data obtained from the second uplink from the second user equipment (2).

In an embodiment the computer program further comprises program code, which when run by the communication node enable the communication node to provide a direct communication link between a first (1) and a second user equipment (2), which program code, which when run by the communication node causes the communication node to provide the direct communication by instructing the second user equipment (2) to communicate directly with the first user equipment (1) using the direct radio link.

In an embodiment the computer program further comprises program code, which when run by the communication node causes the communication node to instruct the first user equipment (1) and/or the second user equipment (2) to report data about the direct radio link to the network.

In an embodiment the computer program further comprises program code, which when run by the communication node causes the communication node to instruct the first user equipment (1) and/or the second user equipment (2) to report data about radio communication resources of the radio access network, such as resource data received in broadcasts from base stations of the cellular radio access network (3), to the node of the radio access network.

Embodiments of Computer Programs for User Equipment

A computer program (19) for a user equipment (1, 2) of a cellular radio access network (3) has been provided, which user equipment is provided for communicating with other user equipment (1). The computer program comprising program code, which when run on the user equipment enables the user equipment to perform a method of monitoring communication in the cellular radio access network (3) for estimating communication in a possible direct link between with an other user equipment (1), when the user equipment (2) communicate with the other user equipment (1) via the cellular radio access network (3). The method of monitoring communication comprises receiving an instruction from the cellular radio access network (3) to eavesdrop the first uplink (UL1), receiving transmissions on the first uplink (UL1), obtaining digital data from the received first uplink (UL1) transmissions, and reporting to the cellular radio access network (3), which reporting includes transmitting the obtained digital data.

In an embodiment, the step of receiving an instruction includes receiving decoding parameters that enable decoding of the first uplink (UL1), and the step of obtaining digital data includes decoding the first uplink (UL1).

In a further embodiment, the decoding parameters includes at least one parameter from a group of parameters including a code-rate of first uplink, a modulation scheme of the first uplink and an encryption key of the first uplink.

In an embodiment, the step of receiving an instruction includes receiving an identification of the data to be eavesdropped in the first uplink (UL1).

In a further embodiment, the identification of data preferably indicates a time period or time-slots of the first uplink and/or a physical resource block of the first uplink.

In an embodiment, the communication comprises decoding data received through the first downlink (DL1) in at least two steps including decoding the data into an intermediate form of digital data and further into the user data, wherein the step of obtaining digital data from the received first uplink (UL1) transmissions comprises decoding the received uplink transmissions into digital data of the intermediate form of digital data.

In an embodiment, the reporting to the cellular radio access network being made by means of a control channel.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of monitoring communication in a radio access network (RAN) for estimating communication in a direct link between a first user equipment (UE) and a second UE, wherein the first UE is configured to communicate user data to the second UE via the RAN by transmitting the user data using a first uplink, the method being performed by the second UE and comprising:
   receiving an instruction from the RAN to eavesdrop the first uplink,
   receiving transmissions on the first uplink;
   obtaining digital data from the received transmissions;
   transmitting to the RAN the digital data obtained from the received transmissions; and
   after transmitting the obtained digital data, receiving a command from the RAN, the received command indicating that the RAN has received the obtained digital data, has compared the received obtained digital data to digital data that the RAN obtained from the transmissions on the first uplink, and has determined, based on the comparison, that a quality of the direct link between the first UE and the second UE fulfils a quality criteria; and
   switching into a device-to-device communication mode in response to receiving the command.

2. The method of claim 1, wherein the step of receiving the instruction includes receiving decoding parameters that enable decoding of the first uplink, and the step of obtaining the digital data includes decoding the first uplink.

3. The method of claim 2, wherein the decoding parameters includes at least one parameter from a group of parameters including a code-rate of the first uplink, a modulation scheme of the first uplink and an encryption key of the first uplink.

4. The method of claim 1, wherein the step of receiving the instruction includes receiving an identification of data to be eavesdropped in the first uplink.

5. The method of claim 1, wherein the instruction includes information indicating a time period or time-slots of the first uplink and/or a physical resource block of the first uplink.

6. The method of claim 1, wherein the communication comprises decoding data received through a first downlink in at least two steps including decoding the data into an intermediate form of digital data and further into the user data, wherein the step of obtaining digital data from the received transmissions comprises decoding the received transmissions into digital data of the intermediate form of digital data.

7. The method of claim 1, wherein the step of transmitting to the RAN the digital data obtained from the received transmissions is performed using a control channel.

8. A first user equipment (UE), the first UE being configured to communicate with a second UE, the first UE comprising:
a transmitter;
a receiver; and
a processor configured to cause the first UE to perform a method of monitoring communication in a radio access network (RAN) for estimating communication in a direct link with the second UE, wherein the second UE is configured to communicate user data to the first UE via the RAN by transmitting the user data using a first uplink, wherein the method of monitoring comprises:
the processor receiving, via the receiver, an instruction from the RAN to eavesdrop the first uplink,
the processor obtaining digital data from first uplink transmissions on the first uplink and received by the receiver,
transmitting to the RAN, via the transmitter, the digital data obtained from the received transmissions,
after transmitting the obtained digital data, receiving a command from the RAN, the received command indicating that the RAN has received the obtained digital data, has compared the received obtained digital data to digital data that the RAN obtained from the first uplink transmissions on the first uplink, and has determined, based on the comparison, that a quality of the direct link between the first UE and the second UE fulfils a quality criteria, and
switching the first UE into a device-to-device communication mode in response to receiving the command.

9. A non-transitory computer readable medium comprising program code, the program code comprising instructions which when run on a first user equipment (UE) enables the first UE to perform a method of monitoring communication in a radio access network (RAN) for estimating communication in a direct link between the first UE and a second UE, wherein the second UE is configured to communicate user data to the first UE via the RAN by transmitting the user data using a first uplink, the method of monitoring communication comprising:
receiving an instruction from the RAN to eavesdrop the first uplink,
receiving transmissions on the first uplink,
obtaining digital data from the received transmissions,
transmitting to the RAN the digital data obtained from the received transmissions,
after transmitting the obtained digital data, receiving a command from the RAN, the received command indicating that the RAN has received the obtained digital data, has compared the received obtained digital data to digital data that the RAN obtained from the transmissions on the first uplink, and has determined, based on the comparison, that a quality of the direct link between the first UE and the second UE fulfils a quality criteria, and
switching into a device-to-device communication mode in response to receiving the command.

* * * * *